(12) United States Patent
Sajid

(10) Patent No.: US 8,997,983 B2
(45) Date of Patent: Apr. 7, 2015

(54) COMBINATION PROTECTIVE CASE AND STAND FOR A TABLET DEVICE AND KEYBOARD

(76) Inventor: Salman Sajid, Herndon, VA (US)

( * ) Notice: Subject to any disclaimer, the term of this patent is extended or adjusted under 35 U.S.C. 154(b) by 707 days.

(21) Appl. No.: 13/110,143

(22) Filed: May 18, 2011

(65) Prior Publication Data

US 2011/0284420 A1 Nov. 24, 2011

Related U.S. Application Data

(60) Provisional application No. 61/346,717, filed on May 20, 2010, provisional application No. 61/353,171, filed on Jun. 9, 2010.

(51) Int. Cl.
*B65D 69/00* (2006.01)
*G06F 1/16* (2006.01)

(52) U.S. Cl.
CPC ...... *G06F 1/1628* (2013.01); *G06F 2200/1633* (2013.01)

(58) Field of Classification Search
USPC .............. 206/320, 736, 751, 452, 45.23
See application file for complete search history.

(56) References Cited

U.S. PATENT DOCUMENTS

| | | | | |
|---|---|---|---|---|
| 1,659,395 A | * | 2/1928 | Douglas | 402/70 |
| 2,695,097 A | * | 11/1954 | Easton | 206/45.21 |
| 4,765,462 A | * | 8/1988 | Rose, Jr. | 206/760 |
| 5,034,858 A | | 7/1991 | Kawamoto et al. | |
| 5,435,437 A | * | 7/1995 | Sasaki | 206/45.23 |
| 5,445,266 A | * | 8/1995 | Prete et al. | 206/320 |
| 5,607,054 A | * | 3/1997 | Hollingsworth | 206/320 |
| 5,639,004 A | | 6/1997 | Carlton et al. | |
| 5,775,497 A | | 7/1998 | Krulik | |
| 5,808,862 A | | 9/1998 | Robbins | |
| 5,887,723 A | * | 3/1999 | Myles et al. | 206/760 |
| 5,931,297 A | | 8/1999 | Weill et al. | |
| 5,996,778 A | * | 12/1999 | Shih | 206/45.2 |
| 6,109,434 A | | 8/2000 | Howard, Jr. | |
| 6,229,697 B1 | | 5/2001 | Selker | |
| 6,267,236 B1 | * | 7/2001 | Seok | 206/320 |
| 6,301,098 B1 | | 10/2001 | Kim | |
| 6,492,714 B1 | | 12/2002 | Kasatani | |
| 6,604,618 B1 | | 8/2003 | Godshaw et al. | |
| 6,772,879 B1 | * | 8/2004 | Domotor | 206/45.23 |
| 6,871,739 B2 | | 3/2005 | Lopez | |

(Continued)

FOREIGN PATENT DOCUMENTS

JP 2007-127980 A 5/2007

OTHER PUBLICATIONS

International Search Report dated Dec. 21, 2011 from corresponding International Patent Application No. PCT/US2011/036937—3 pages.

*Primary Examiner* — Steven A. Reynolds
*Assistant Examiner* — King M Chu
(74) *Attorney, Agent, or Firm* — LeonardPatel PC

(57) ABSTRACT

A combination protective case and stand for a tablet device and keyboard. The case includes a first panel configured to receive a tablet device on a first face of the first panel, a second panel pivotably coupled to the first panel and configured to receive a keyboard on a first face of the second panel, and a cover portion pivotably coupled to the first panel and configured to enclose the first panel and the second panel such that a first face of the cover portion is disposed in facing relation to the first panel and in facing relation to the second panel.

12 Claims, 14 Drawing Sheets

(56) References Cited

U.S. PATENT DOCUMENTS

| | | | |
|---|---|---|---|
| 6,896,134 B2 | 5/2005 | Russell et al. | |
| 6,976,799 B2 | 12/2005 | Kim et al. | |
| D515,588 S | 2/2006 | Kirkwood | |
| 7,191,926 B1* | 3/2007 | Costantino et al. | 224/605 |
| 7,281,698 B2* | 10/2007 | Patterson, Jr. | 248/458 |
| 7,318,521 B2* | 1/2008 | Lau | 206/45.24 |
| 7,522,410 B2* | 4/2009 | Pichahchi | 361/690 |
| D604,045 S | 11/2009 | Schantz et al. | |
| 8,297,443 B2* | 10/2012 | Ogando | 206/750 |
| 2002/0179470 A1* | 12/2002 | Lee | 206/320 |
| 2004/0075282 A1 | 4/2004 | Silverman et al. | |
| 2004/0173482 A1* | 9/2004 | Nieves | 206/320 |
| 2006/0060485 A1* | 3/2006 | Picot et al. | 206/320 |
| 2006/0226040 A1* | 10/2006 | Medina | 206/320 |
| 2007/0177344 A1 | 8/2007 | Hsia | |
| 2007/0246386 A1* | 10/2007 | Nykoluk et al. | 206/320 |
| 2008/0202959 A1* | 8/2008 | Chu | 206/320 |
| 2010/0044259 A1* | 2/2010 | Wang | 206/320 |
| 2010/0110629 A1* | 5/2010 | Dietz et al. | 361/679.55 |
| 2010/0122924 A1* | 5/2010 | Andrews | 206/320 |
| 2010/0294683 A1* | 11/2010 | Mish et al. | 206/320 |

* cited by examiner

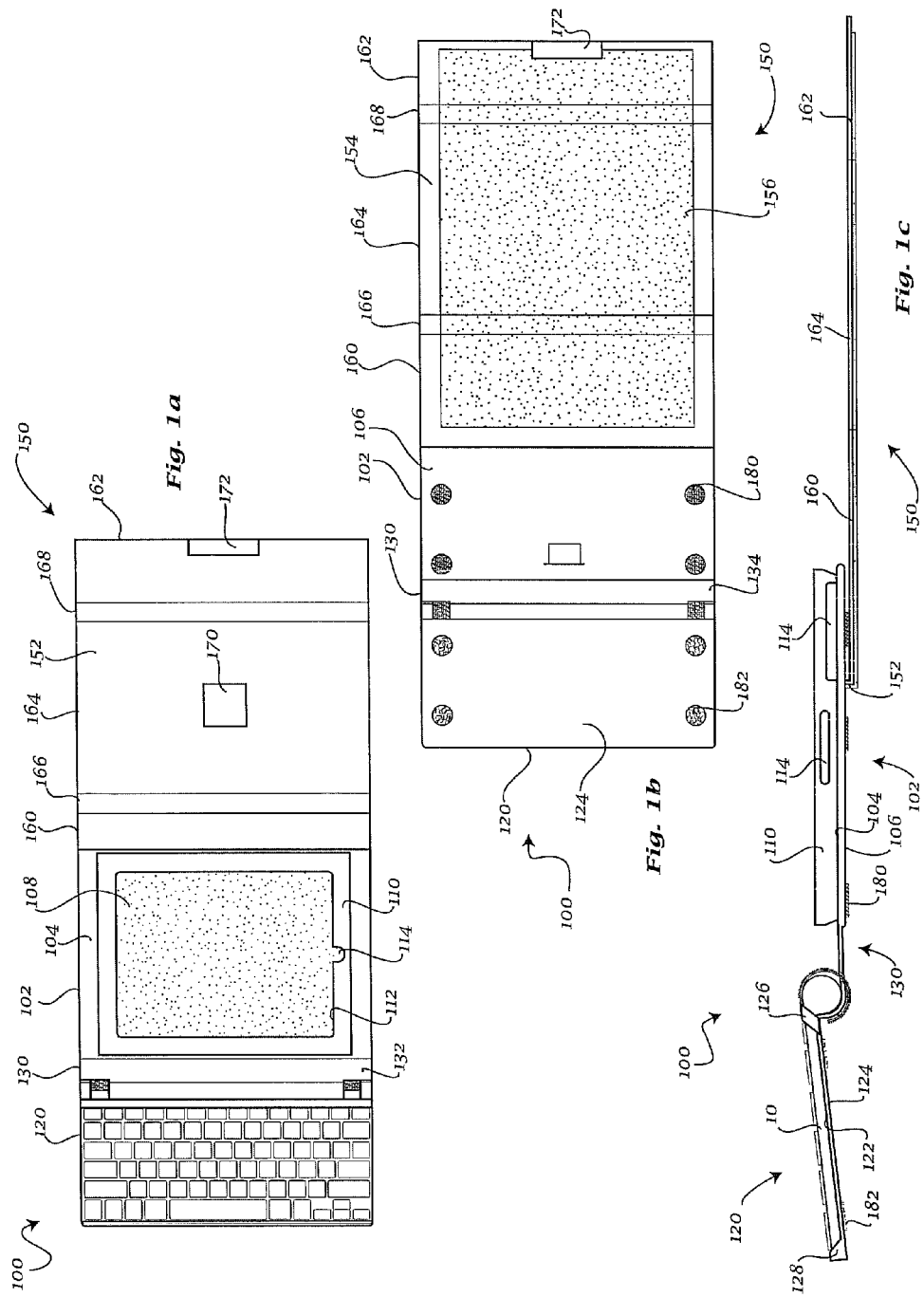

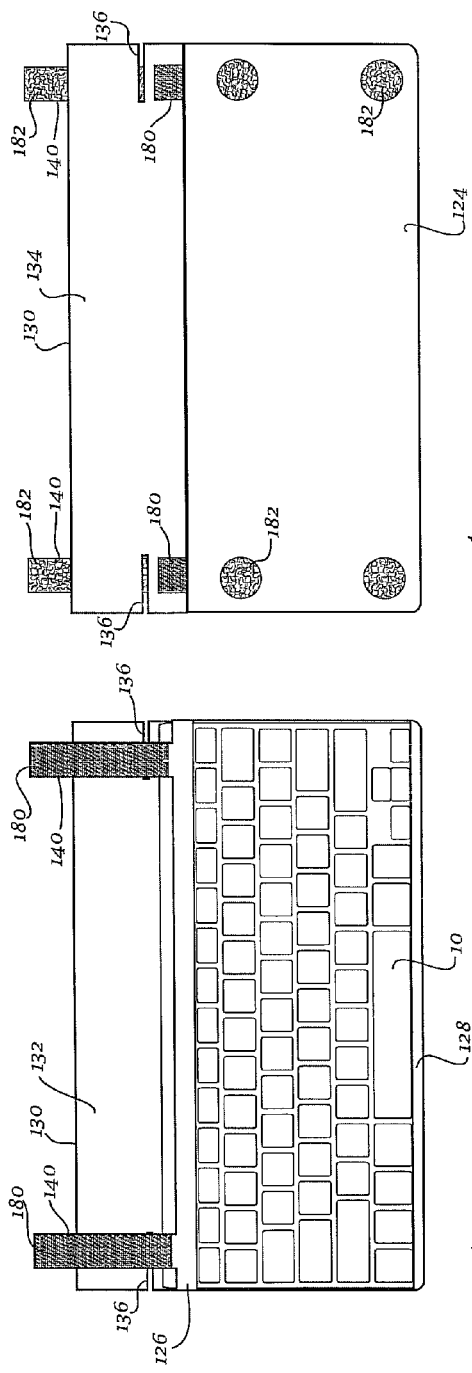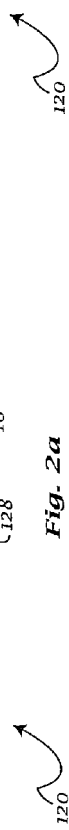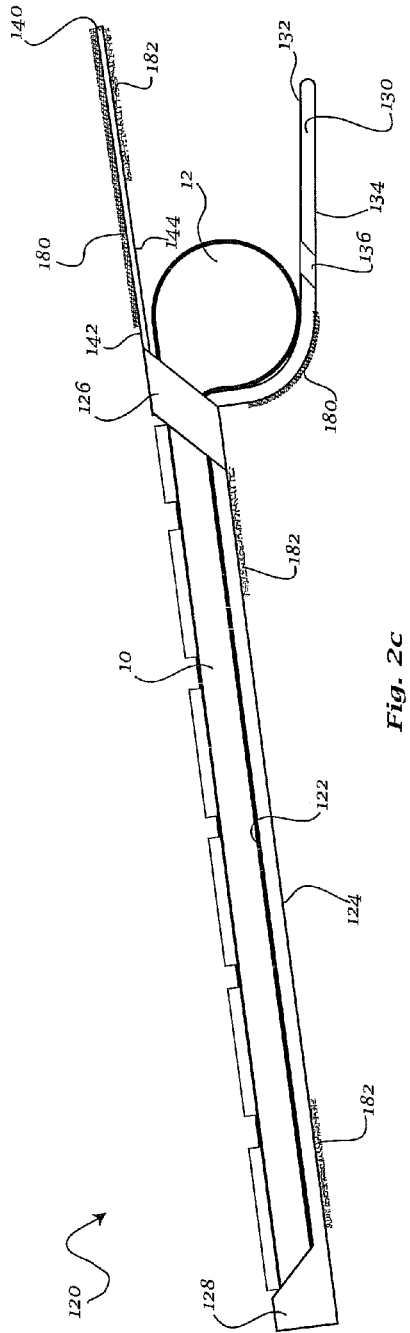

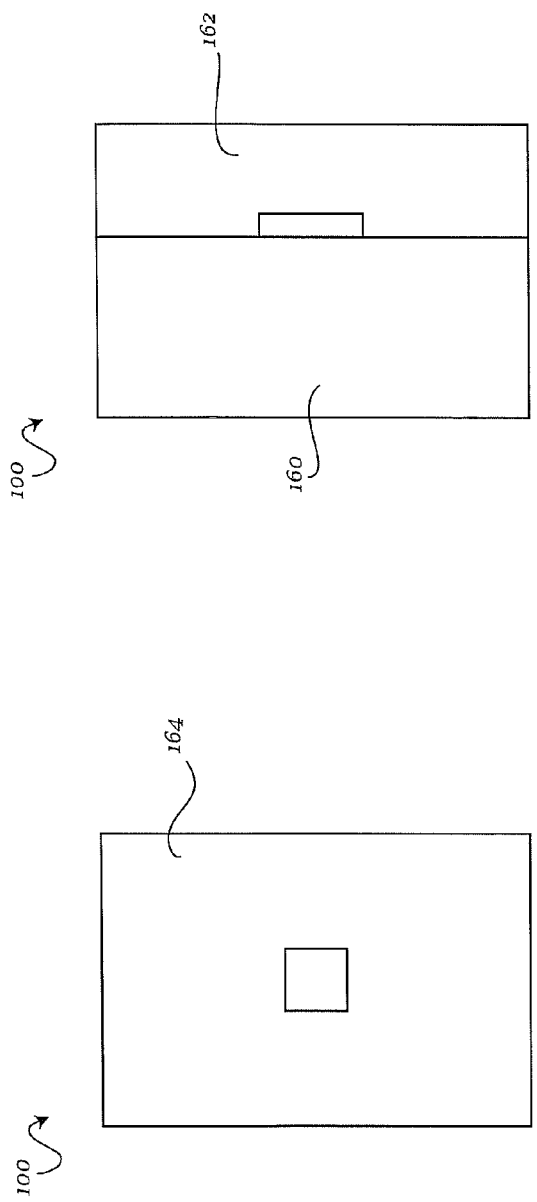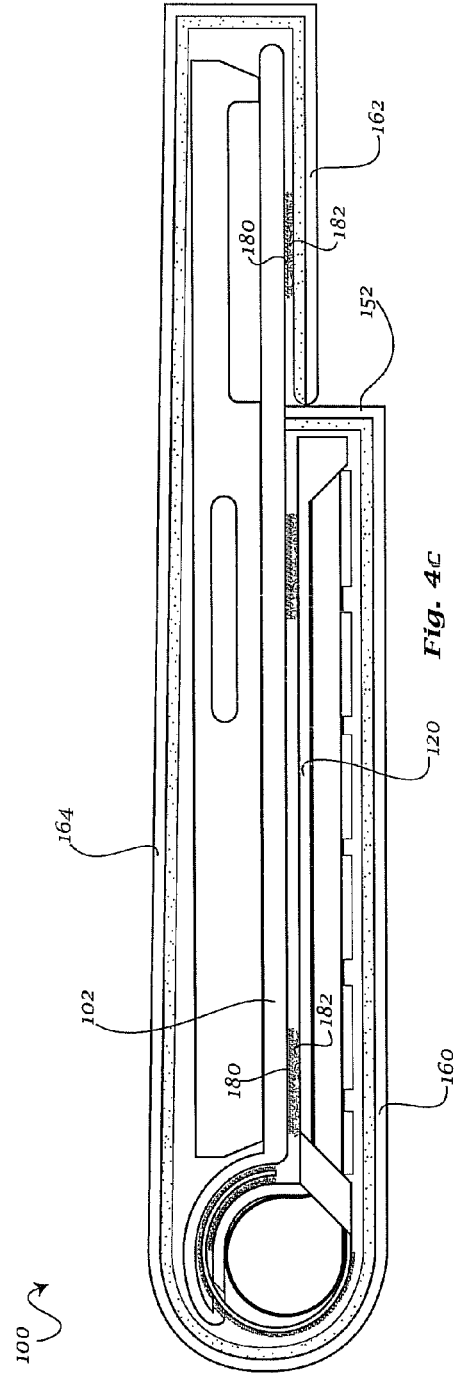

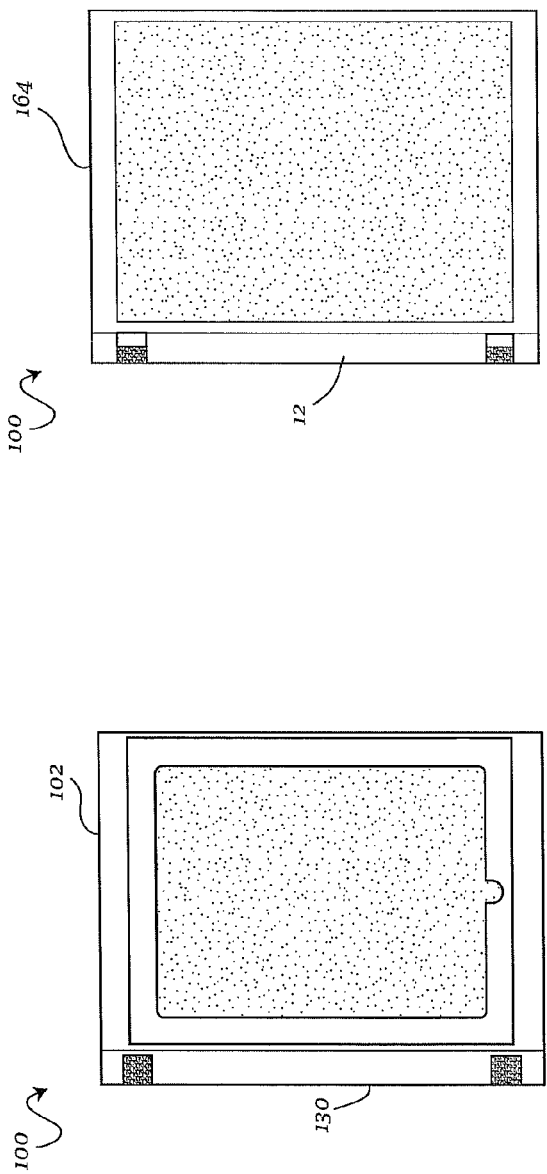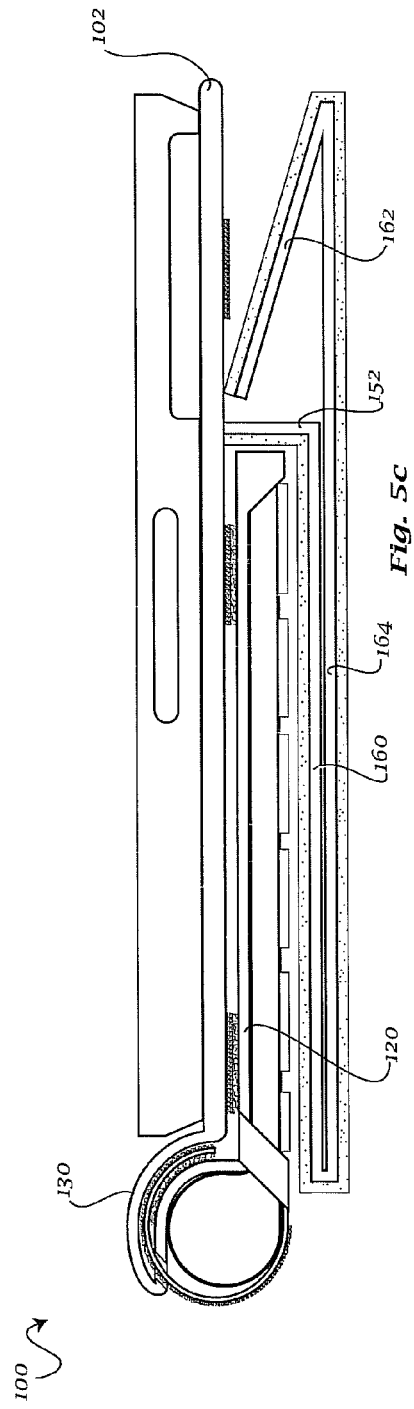

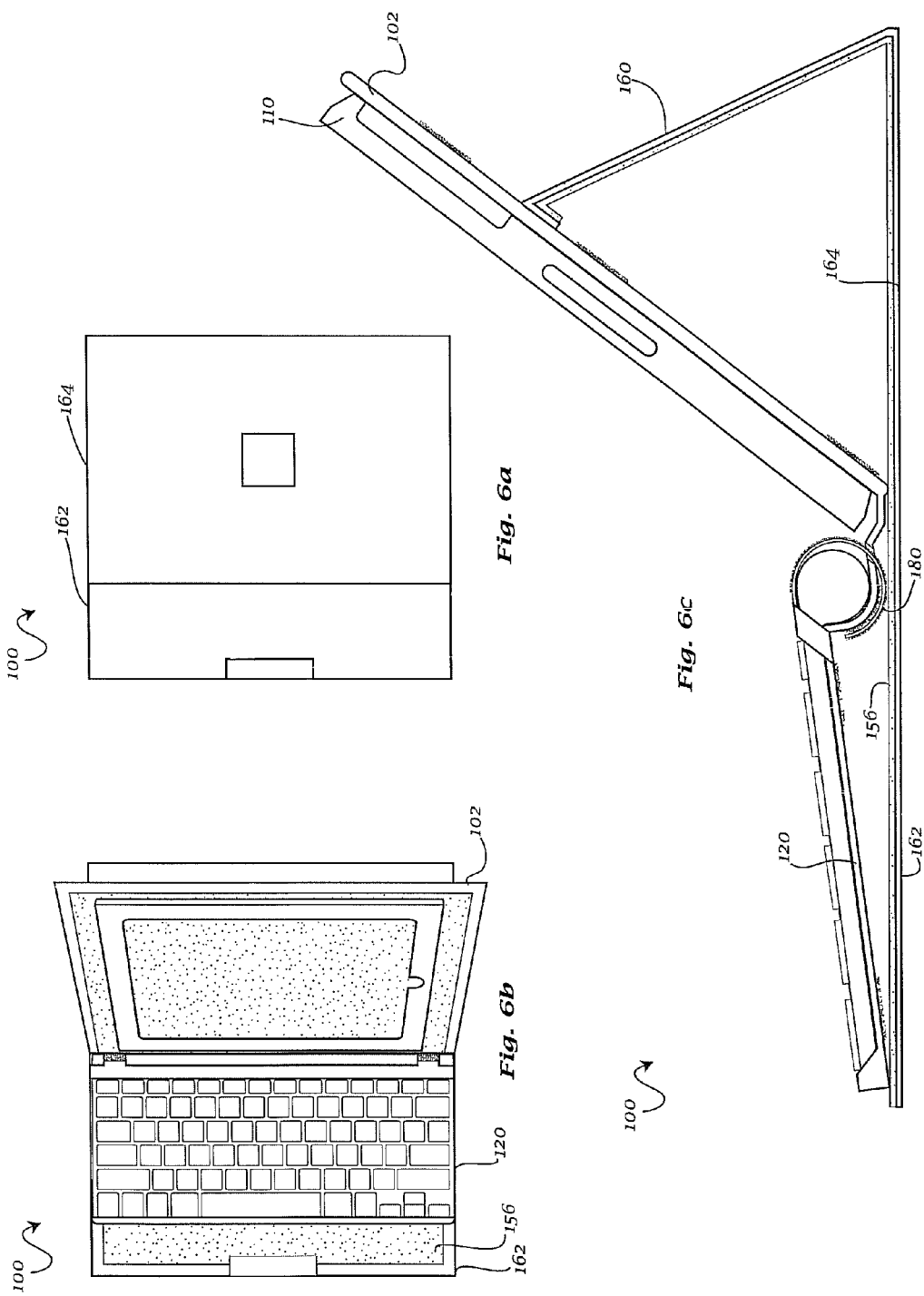

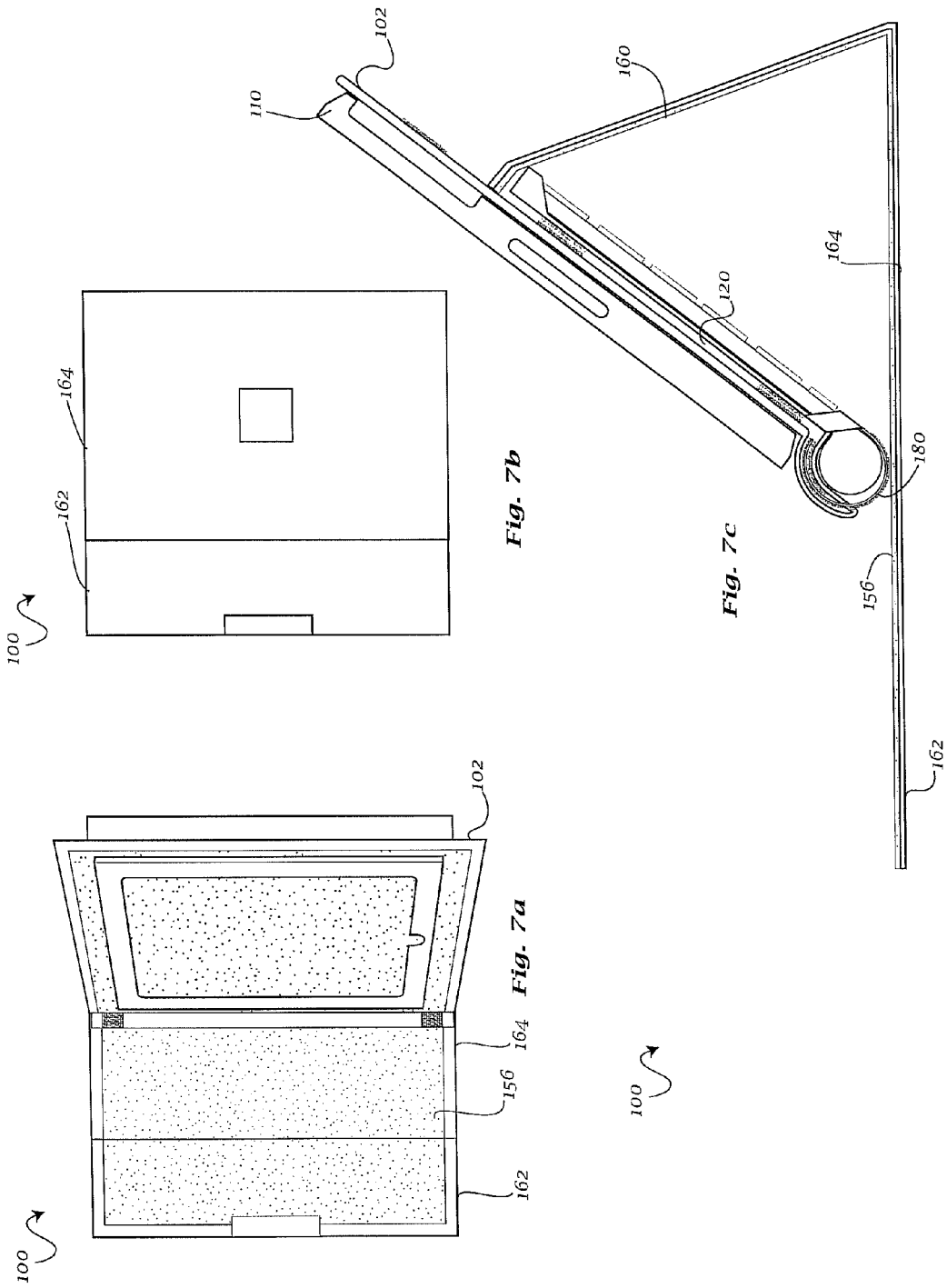

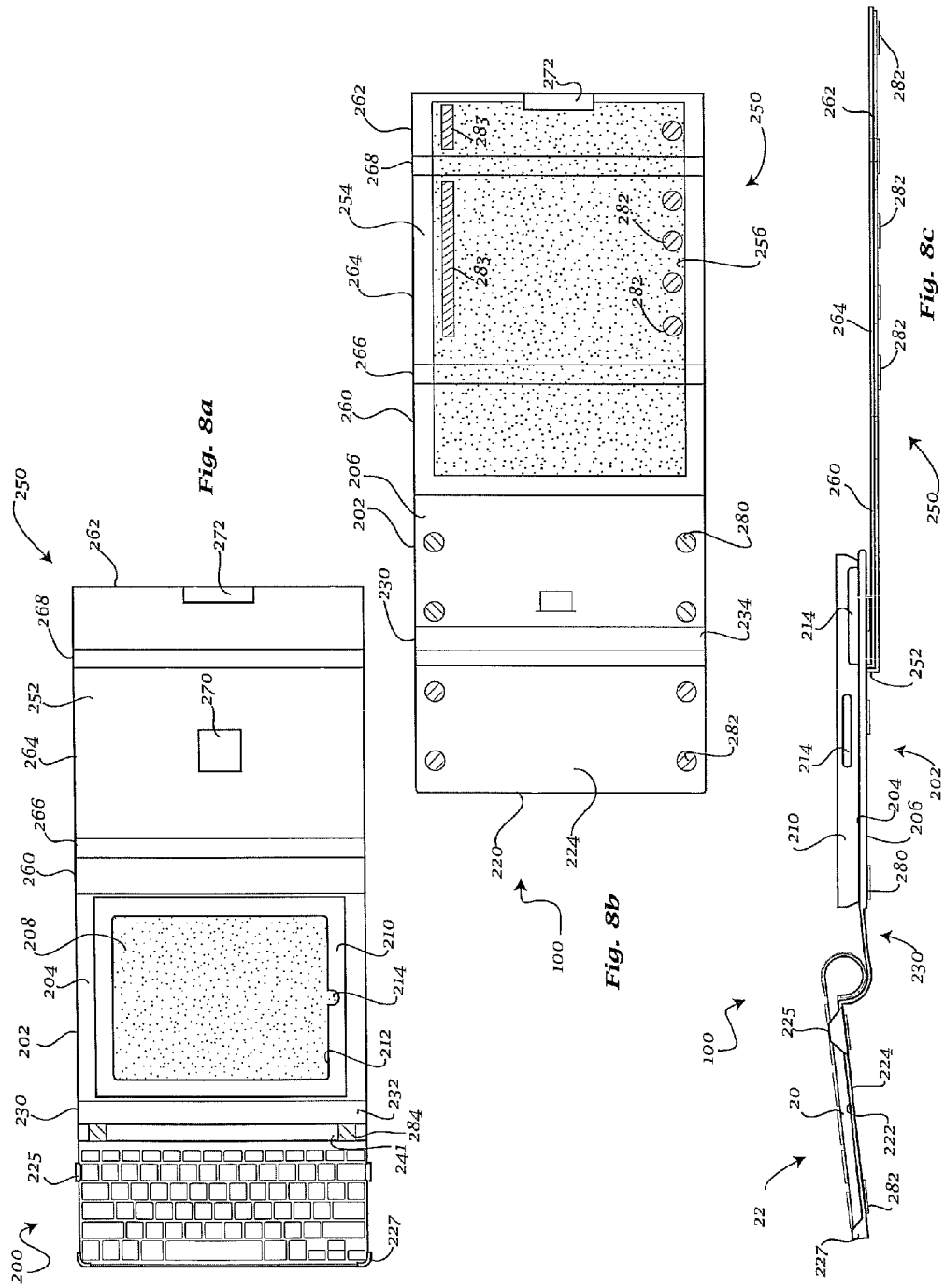

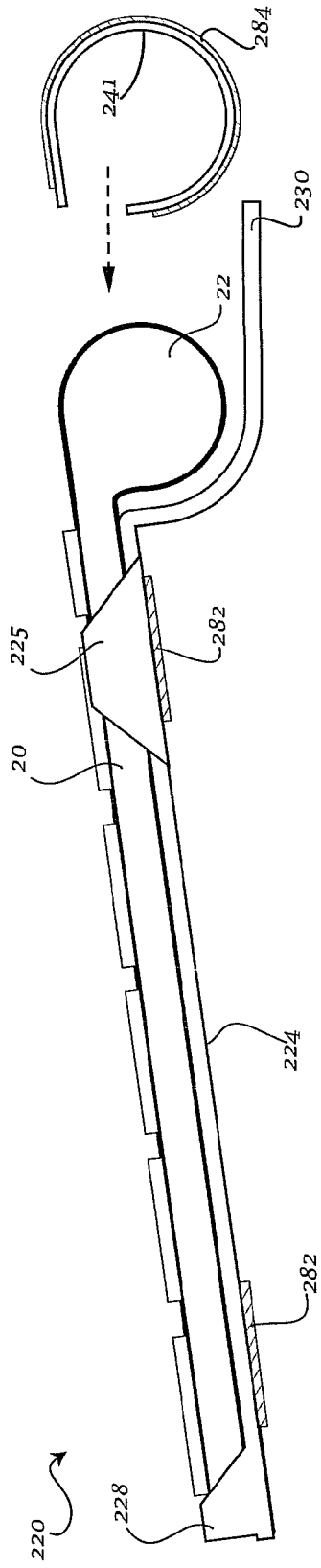
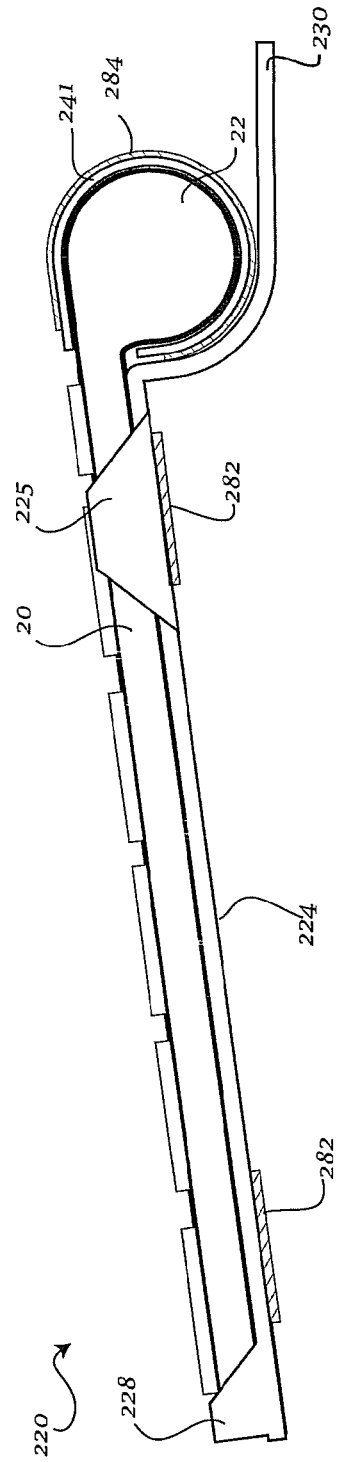
Fig. 9a
Fig. 9b

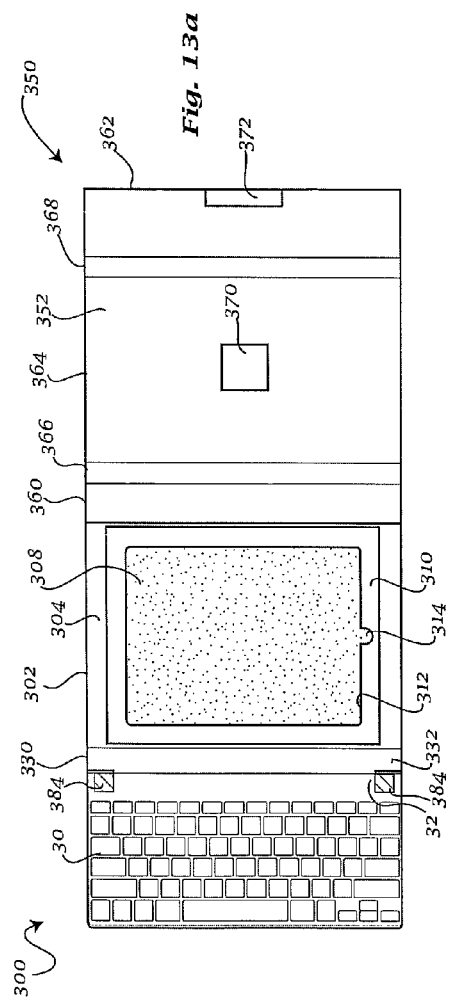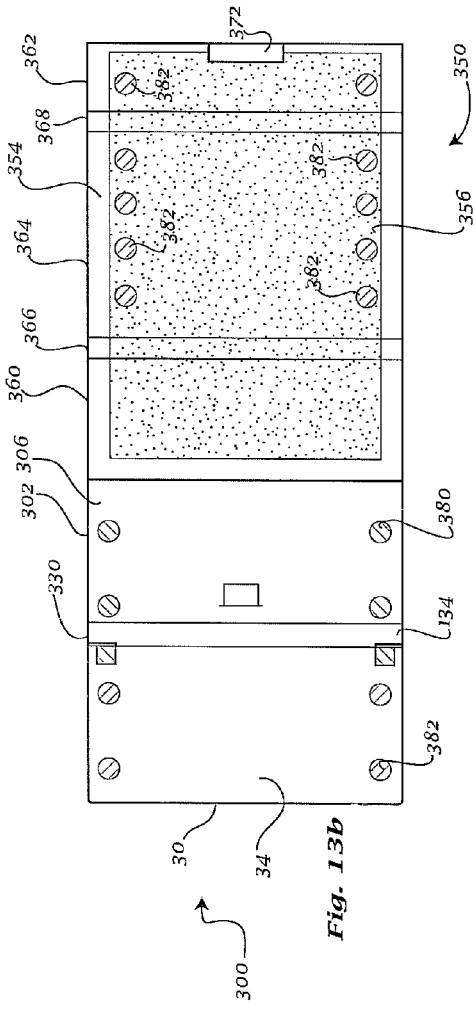

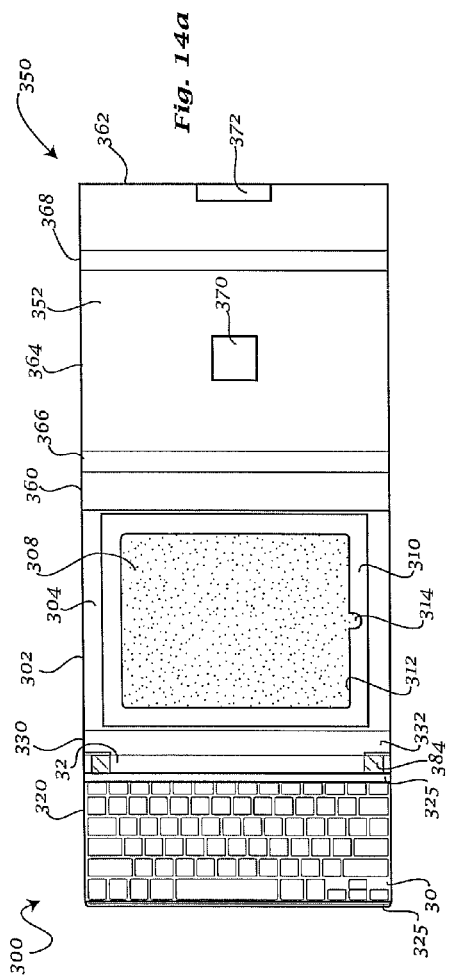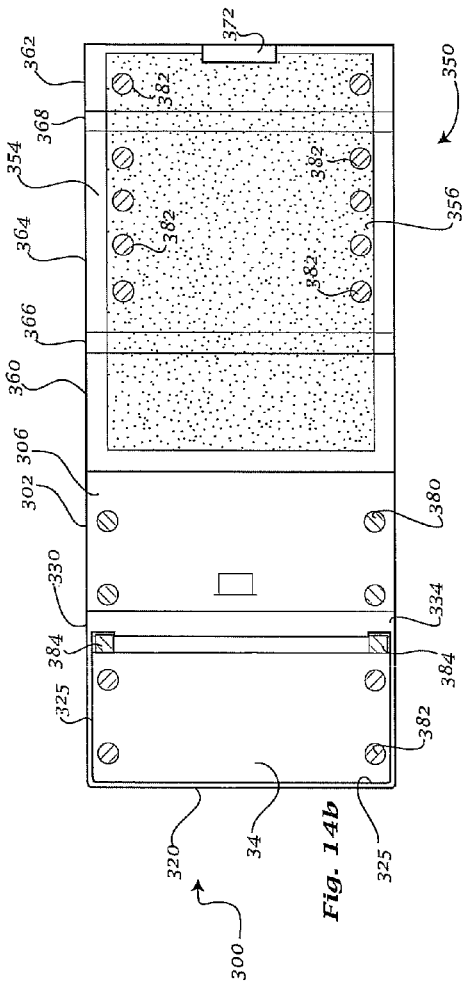

COMBINATION PROTECTIVE CASE AND STAND FOR A TABLET DEVICE AND KEYBOARD

CROSS-REFERENCE TO RELATED APPLICATIONS

This application claims priority to U.S. Provisional Patent Application No. 61/346,717, filed May 20, 2010 and entitled PROTECTIVE CASE FOR A TABLET COMPUTER AND KEYBOARD, and U.S. Provisional Patent Application No. 61/353,171, filed Jun. 9, 2010 and entitled PROTECTIVE CASE FOR A TABLET COMPUTER AND KEYBOARD, the entire contents of which are hereby incorporated by reference.

BACKGROUND

Tablet computing devices, have become increasingly popular in recent years due to their ease of use, light weight and portability. Such devices typically include a thin, lightweight case and a touch-sensitive screen that occupies a majority of the area of the front face of the tablet. The touch-sensitive screen allows for ease of interaction with the interface of the tablet and for convenient consumption of media such as videos, photographs, and music, as well as web browsing and email.

While tablet devices are convenient for media consumption, they are less convenient for media creation, for example, word-processing and email composition. This stems from the fact that on a tablet device, text is typically input via an on-screen keyboard, which lacks the tactile feedback of a physical keyboard, and is less conducive to rapid and accurate typing. To alleviate this inconvenience, some tablet devices can couple to a physical keyboard, for example via the Bluetooth wireless communications standard. However, the separate physical keyboard reduces the portability and convenience of the tablet device.

Additionally, tablets are adapted for being held in the user's hands during usage; if the user's hands are occupied, the tablet typically must be laid flat on a surface. Neither arrangement allows for convenient viewing of the tablet simultaneous with the use of a keyboard.

A convenient solution for transporting and situating a tablet computing device and associated keyboard is therefore desired.

SUMMARY

According to at least one exemplary embodiment, a combination protective case and stand for a tablet device and keyboard is disclosed. The case includes a first panel configured to receive a tablet device on a first face of the first panel, a second panel pivotably coupled to the first panel and configured to receive a keyboard on a first face of the second panel, and a cover portion pivotably coupled to the first panel and configured to enclose the first panel and the second panel such that a first face of the cover portion is disposed in facing relation to the first panel and in facing relation to the second panel. The second panel can be pivoted so as to place the second panel in facing relation to a second face of the first panel. The cover portion may include a first cover panel, a second cover panel and a central cover panel disposed between the first cover panel and the second cover panel. At least one fastener may be disposed on a second face of the first panel and at least one complementary fastener may be disposed on a second face of the second panel. The case can further include at least one adjoining member adapted to be placed in adjoining relation with a rear portion of the keyboard. The adjoining member can include at least one fastener on a first face of the adjoining member. A covering may be disposed on the first face of the cover portion. The covering may be adapted to couple with the at least one fastener of the adjoining member.

BRIEF DESCRIPTION OF THE FIGURES

Advantages of embodiments of the present invention will be apparent from the following detailed description of the exemplary embodiments. The following detailed description should be considered in conjunction with the accompanying figures in which:

FIGS. 1a-1c show a first exemplary embodiment of a combination protective case and stand for a tablet device and keyboard in an open, flat configuration.

FIGS. 2a-2c show a first exemplary embodiment of a keyboard panel in a first configuration.

FIGS. 4a-4c show the first exemplary embodiment of the case in a compact, closed configuration.

FIGS. 5a-5c show the first exemplary embodiment of the case in a compact, open configuration.

FIGS. 6a-6c show the first exemplary embodiment of the case in a laptop mode configuration.

FIGS. 7a-7c show the first exemplary embodiment of the case in a hidden keyboard laptop configuration.

FIGS. 8a-8c show a second exemplary embodiment of a combination protective case and stand for a tablet device and keyboard in an open, flat configuration.

FIGS. 9a-9b show a second exemplary embodiment of a keyboard panel.

FIGS. 13a-13b show a third exemplary embodiment of a combination protective case and stand for a tablet device and keyboard in an open, flat configuration.

FIGS. 14a-14b show a third exemplary embodiment of a combination protective case and stand for a tablet device and keyboard, where the keyboard may be separately formed from the case.

DETAILED DESCRIPTION

Figure 3A:
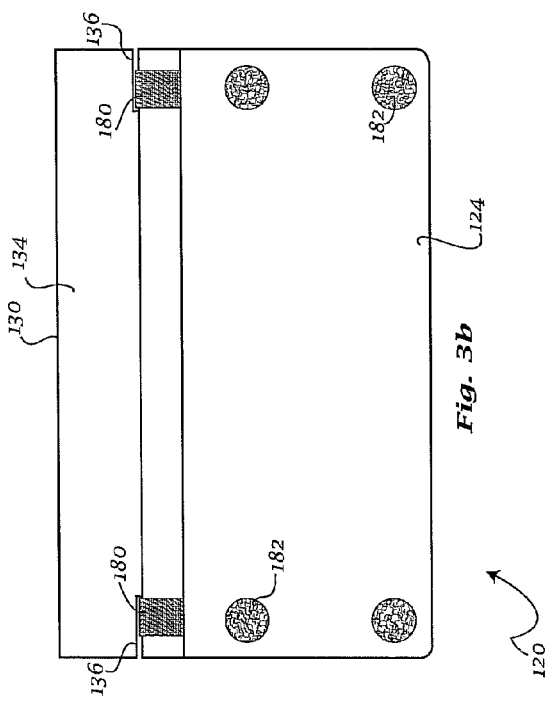
FIGS. 3a-3c show a first exemplary embodiment of a keyboard panel in a second configuration.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation. Furthermore, when elements are described as "coupled" or "connected," it should be understood that the elements may be directly connected to each other or may be connected through one or more intervening elements.

Generally referring to FIGS. 1a-7c, a combination protective case and stand for a tablet device and keyboard 100 is disclosed. Case 100 may include structures for retaining a tablet device and a keyboard therein. Case 100 can further include a plurality of panels which may be arranged in various positions so as to allow case 100 to be adapted to a variety of desired functionalities. For example, case 100 may be placed in a compact, closed configuration for transporting the tablet device and keyboard and protecting the tablet device and keyboard during transport, with the keyboard hidden behind the tablet device. Case 100 may further be placed in a compact open configuration for handheld use of the tablet device, with the keyboard hidden behind the tablet device. Case 100 may further be placed in an angled open configuration for use of the tablet device on top of a surface. In the angled open configuration, the keyboard may be presented or hidden as desired. Case 100 may also include structures for maintaining the plurality of panels in desired positions. It should be appreciated that the configurations and positions described herein are not limiting, and that a variety of configurations and positions for case 100 may be contemplated and presented as desired.

Case 100, or portions thereof may include an outer covering that is formed from any desired material, for example leather, imitation leather, leatherette, cloth, microfiber, synthetic polymer-based materials, or any other material known in the art that enables case 100 to function as described herein, or any desired combinations of materials. Rigidity may be provided to desired portions of case 100 through the use of rigid inserts or rigid shells made from any material known in the art that enables case 100 to function as described herein. Portions of case 100 may be provided with fasteners, such as hook-and-loop fasteners, snaps, clasps, buttons, tab-and-slot fasteners, or any fastener known in the art that enables case 100 to function as described herein. Furthermore, portions of case 100 may be provided with a napped covering, for example felt, suede, alcantara, velvet, or any other covering having a napped pile or texture known in the art that enables case 100 to function as described herein. The napped covering may further cooperate with the fasteners so as to facilitate coupling between the fasteners and the napped covering.

Embodiments of the combination protective case and stand for a tablet device and keyboard illustrated in the provided figures are adapted for use with a tablet computing device such as the iPad, developed and sold by Apple, Inc. and a wireless keyboard such as the Apple Wireless Keyboard, also developed and sold by Apple, Inc. However, it should be appreciated that embodiments of case 100, as well as the configurations and concepts disclosed herein may be adapted for use with any known tablet device and keyboard, and are not limited solely to the illustrated devices.

FIGS. 1a-1c show case 100 in an open, flat configuration, illustrating the plurality of panels of case 100. Case 100 may include a tablet panel 102 having a first face 104 and a second face 106. A portion of first face 104 of tablet panel 102 may include a napped covering 108 disposed thereon. First face 104 of tablet panel 102 may further include a tablet sleeve 110 disposed thereon. Tablet sleeve 110 may be sized to receive a tablet computing device therein, and to snugly and securely maintain the tablet computing device within tablet sleeve 110. Tablet sleeve 110 may further include an opening 112 sized to allow viewing of the screen of the tablet computing device therethrough. Opening 112 may be uncovered, or may include a transparent protective cover (not shown) that allows for operation of the touch-screen of the tablet computing device. Tablet sleeve 110 may further include a plurality of apertures 114 for accessing the hardware ports and buttons of the tablet computing device. Second face 106 of tablet panel 102 may include a plurality of fasteners 180 disposed thereon. For example, fasteners 180 may be hooked fasteners or looped fasteners of a hook-and-loop fastener arrangement, or any other desired fastener member.

Case 100 can further include a keyboard panel 120 having a first face 122 and a second face 124. Keyboard panel 120 may be pivotably coupled to tablet panel 102, for example via a flexible panel 130 having a first face 132 and a second face 134. Coupled to keyboard panel 120 may be first band 126 and second band 128, which may be sized to receive a keyboard 10 between first face 122 and bands 126, 128 and to snugly and securely maintain keyboard 10 therein. Second face 124 of keyboard panel 120 may include a plurality of complementary fasteners 182 disposed thereon. For example, complementary fasteners 182 may be looped fasteners or hooked fasteners of a hook-and-loop fastener arrangement, or any other desired fastener member that is adapted to couple with fasteners 180.

Figure 3B:
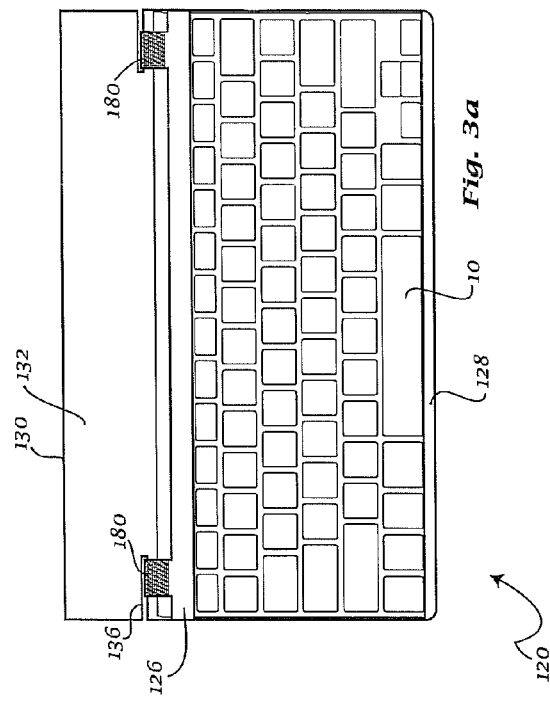
Figure 3C:
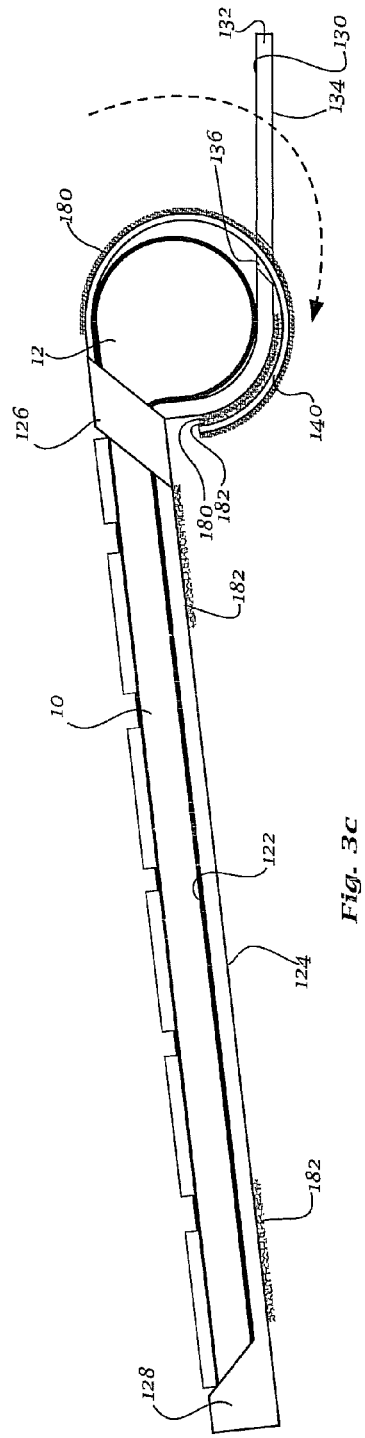

FIGS. 2a-2c and FIGS. 3a-3c show a detail of keyboard panel 120 and flexible panel 130. First band 126 may be provided with at least two fastening straps 140, each fastening strap having a first face 142 and a second face 144. First faces 142 of fastening straps 140 may be provided with fasteners 180 and second faces 144 of fastening straps 140 may be provided with complementary fasteners 182. After keyboard 10 is inserted under bands 126, 128. As shown in FIGS. 3a-3c, straps 140 can then be inserted through slits 136 defined in flexible portion 130 so as to place straps 140 in adjoining relation with rear portion 12 of keyboard 10. Straps 140 can then be secured by coupling fasteners 180 disposed on second face 134 of flexible portion 130 to complementary fasteners 182 disposed on second faces 144 of straps 140.

Turning back to FIGS. 1a-1c, a cover portion 150 may be pivotably coupled to a bridging panel 158, which can in turn be coupled to second face 106 of tablet panel 102. Alternatively, cover portion 150 may be directly pivotably coupled to second face 106 of tablet panel 102. Cover portion 150 may include a rigid first panel 160, a rigid second panel 162, and a central panel 164 disposed between the first and second panels. In one embodiment, central panel 164 may be flexible and may be pivotably coupled to first panel 160 and second panel 162. Alternatively, central panel 164 may be rigid and may be pivotably coupled to first panel 160 via a first flexible panel 166, and to second panel 162 via a second flexible panel 168. The pivotable couplings of First panel 160, second panel 162, and central panel 164 may be such that each of panels 160, 162, 164 may be fully articulable, with respect to the panels proximate thereto, about the longitudinal axis of the pivotable coupling.

Cover portion 150 may have a first face 152 and a second face 154. A portion of first face 152 of cover portion 150 may include a napped covering 156 disposed thereon. Second face 154 may include a logo, ornament, decorative feature, or other indicia 170 disposed thereon. Additionally, second panel 162 may include a logo, ornament, decorative feature, or other indicia 172 disposed at the edge thereof such that indicia 172 may be visible on both first face 152 and second face 154.

FIGS. 4a-4c show case 100 in an exemplary compact, closed configuration. In the closed configuration, keyboard panel 120 can be positioned such that second face 124 of keyboard panel 120 is proximate second face 106 of tablet panel 102. Keyboard panel 120 can then be coupled to tablet panel 102 using fasteners 180 of tablet panel 102 and complementary fasteners 182 of keyboard panel 120. Cover portion 150 can then be pivotally moved towards keyboard panel 120 and around tablet panel 102, such that cover portion encloses panels 102, 120, with first panel 160 disposed in facing relation to first face 122 of keyboard panel 120, central panel 164 disposed in facing relation to first face 104 of tablet panel 102, and second panel 162 disposed in facing relation to a portion of second face 104 of tablet panel 102 and proximate bridging panel 158. Second panel 162 can then be coupled to second face 104 of tablet panel 102 using fasteners 180 of tablet panel 102 and complementary fasteners 182 of second panel 162. The compact closed configuration thus allows one to conveniently transport case 100 while protecting the tablet device and keyboard from damage. Furthermore, keyboard panel 120 can be disposed behind and coupled to tablet panel 102. Consequently, keyboard 10 is disposed behind, and not in front of the tablet device, facilitating minimizing damage to the screen of the tablet device during transport and storage.

FIGS. 5a-5c show case 100 in an exemplary compact, open configuration. In the open configuration, keyboard panel 120 can be positioned such that second face 124 of keyboard panel 120 is proximate second face 106 of tablet panel 102. Keyboard panel 120 can then be coupled to tablet panel 102 using fasteners 180 of tablet panel 102 and complementary fasteners 182 of keyboard panel 10. Cover portion 150 can then be pivotally moved towards keyboard panel 120 such that first panel 160 is disposed in facing relation to first face 122 of keyboard panel 120. Central panel 164 can then be pivoted around such that it is positioned in contact with first panel 160. Second panel 162 can then be folded, if desired, between central panel 164 and tablet panel 102. The compact open configuration thus allows one to use the tablet device while providing a compact form factor that allows case 100 to be held with one or both hands, if desired. Furthermore, keyboard panel 120 can be disposed behind and coupled to tablet panel 102. Consequently, as keyboard 10 is disposed behind the tablet device and does not interfere with handheld use of the tablet device, the tablet device does not need to be removed from case 100 for handheld use.

FIGS. 6a-6c show case 100 in an exemplary laptop mode configuration. In the laptop configuration, second panel 162 and central panel 164 of cover portion 150 can be placed on a surface such that napped covering 156 is oriented away from the surface. Tablet panel 102 and keyboard panel 120 can then be placed on top of second and central panels 162, 164, with first panel 160 acting as a support that facilitates maintaining tablet panel 102 in an angled relation to the surface on which case 100 placed. A desired angle for tablet panel 102 may be achieved by repositioning tablet panel 102 and keyboard panel 120 along the length of the second and central panels 162, 164 of cover portion 150. Furthermore, the fasteners 180 that are disposed on the first face 142 of fastening straps 140 can couple to the napped surface 156 of cover portion 150, thereby preventing movement of tablet panel 102 and keyboard panel 120, and allowing the desired angle to be securely maintained. The laptop mode configuration thus allows one to position the tablet device at a convenient viewing angle and to simultaneously use the keyboard in conjunction with the tablet device.

FIGS. 7a-7c show case 100 in an exemplary hidden keyboard laptop configuration. In the hidden keyboard laptop configuration, second panel 162 and central panel 164 of cover portion 150 can be placed on a surface such that napped covering 156 is oriented away from the surface. Keyboard panel 120 can be positioned such that second face 124 of keyboard panel 120 is proximate second face 106 of tablet panel 102. Keyboard panel 120 can then be coupled to tablet panel 102 using fasteners 180 of tablet panel 102 and complementary fasteners 182 of keyboard panel 120. Tablet panel 102 can then be placed on top of second and central panels 162, 164, with first panel 160 of cover portion 150 acting as a support that facilitates maintaining tablet panel 102 in an angled relation to the surface on which case 100 placed. A desired angle for tablet panel 102 may be achieved by repositioning tablet panel 102 along the length of the second and central panels 162, 164 of cover portion 150. Furthermore, the fasteners 180 that are disposed on the first face 142 of fastening straps 140 can couple to the napped surface 156 of cover portion 150, thereby preventing movement of tablet panel 102, and allowing the desired angle to be securely maintained. The laptop mode configuration thus allows one to position the tablet device at a convenient viewing angle while the keyboard remains concealed and protected behind the tablet device. Furthermore, keyboard panel 120 can be disposed behind and coupled to tablet panel 102 during transport. Consequently, keyboard 10 is disposed behind, and not in front of the tablet device, which facilitates protecting keyboard 10 from debris, liquid, and other possible sources of damage while case 100 is in a laptop configuration.

FIGS. 8a-12 illustrate another exemplary embodiment of a combination protective case and stand for a tablet device and keyboard 200. Most components of the embodiment of case 200 are the same or similar to those of the embodiment of case 100, and are identified by similar numerals. Such components should be understood to have substantially similar characteristics and functionality in both embodiments.

The embodiments of case 200 may be provided with magnetic fasteners 280, and complementary magnetic fasteners 282 in lieu of fasteners 180, 182 of the embodiments of case 100. Magnetic fasteners 280 may be provided on the second face 206 of tablet panel 202. Complementary magnetic fasteners 282 may be provided on the second face 224 of keyboard panel 220, and on the first face 252 of cover portion 250, as shown in FIGS. 8a-8c. Magnetic fasteners 280 may be permanent magnets oriented so as to couple with complementary magnetic fasteners 282 or may be formed from a ferromagnetic material. Complementary magnetic fasteners 282 may be formed from a ferromagnetic material or may be permanent magnets oriented so as to couple with magnetic fasteners 280. Alternatively, a plurality of complementary fastening strips 283 may be provided on the first face 252 of cover portion 250, in place of the complementary fasteners 282, as shown in FIG. 8b. Complementary fastening strips 283 may be formed from a ferromagnetic material or may be permanent magnets oriented so as to couple with magnetic fasteners 280. It should be appreciated that magnetic fasteners 280, complementary magnetic fasteners 282, and complementary fastening strips 283 need not be exposed on the surface of their respective panels, but may be disposed behind a covering such that the fasteners 280, 282, 283 are hidden while retaining the coupling functionality.

FIGS. 9a-9b show a detail of keyboard panel 220 and flexible panel 230. Coupled to keyboard panel 220 may be side tabs 225 and corner tabs 227, which may be disposed so as to receive a keyboard 10 therebetween, and to snugly and securely maintain keyboard 20 in place. Additionally, sheath 241 may be provided, and placed in adjoining relation with the rear portion 22 of keyboard 20, for example by snap fit, by sliding sheath 241 on to rear portion 22, or by any other manner. Sheath 241 can include a pair of fastening strips 284 disposed on the exterior face thereof. Fastening strips 284 may be permanent magnets oriented so as to couple with complementary magnetic fasteners 282 or complementary fastening strips 283, or may be formed from a ferromagnetic material.

Figure 10A:
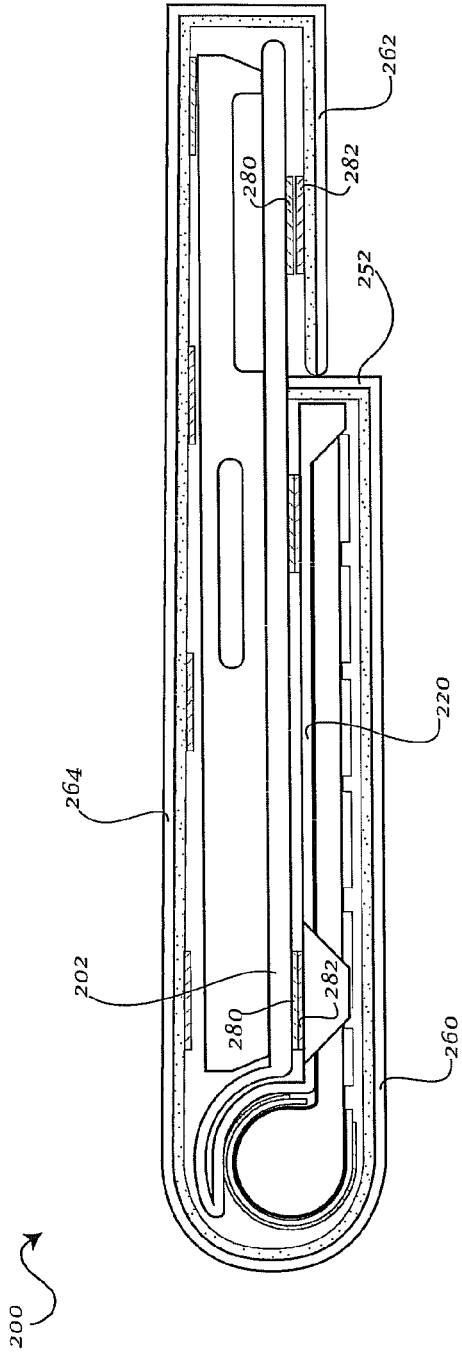
FIG. 10a shows the second exemplary embodiment of the case in a compact, closed configuration.
Figure 10B:
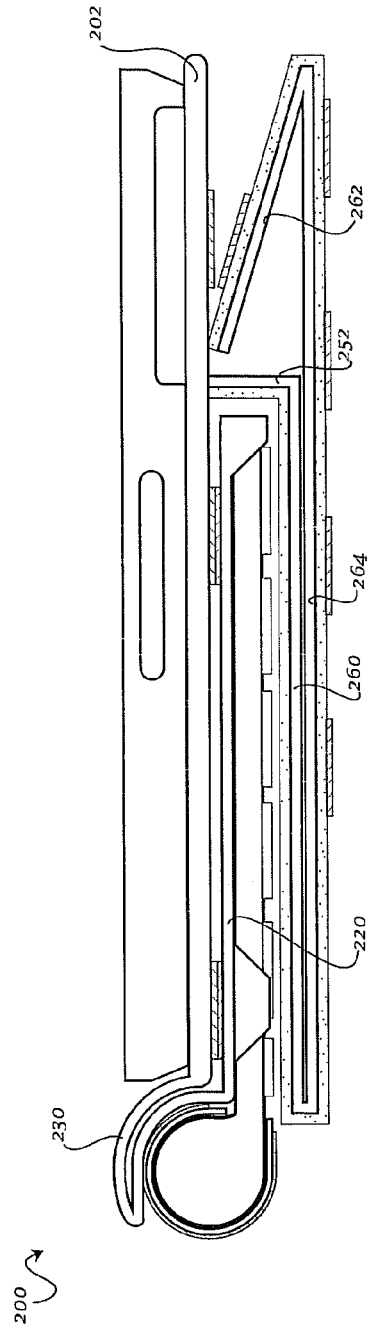
FIG. 10b shows the second exemplary embodiment of the case in a compact, open configuration.

As shown in FIGS. 10a-10b, when case 200 is an exemplary compact closed configuration, magnetic fasteners 280 of tablet panel 202 may be coupled to complementary magnetic fasteners 282 of keyboard panel 220 and to complementary magnetic fasteners 282 of second panel 262 of cover portion 250. In the exemplary compact open configuration, second panel 262 may be uncoupled from tablet panel 202 and second and central panels 262, 264 may be folded behind first panel 260 of cover portion 250.

Figure 11:
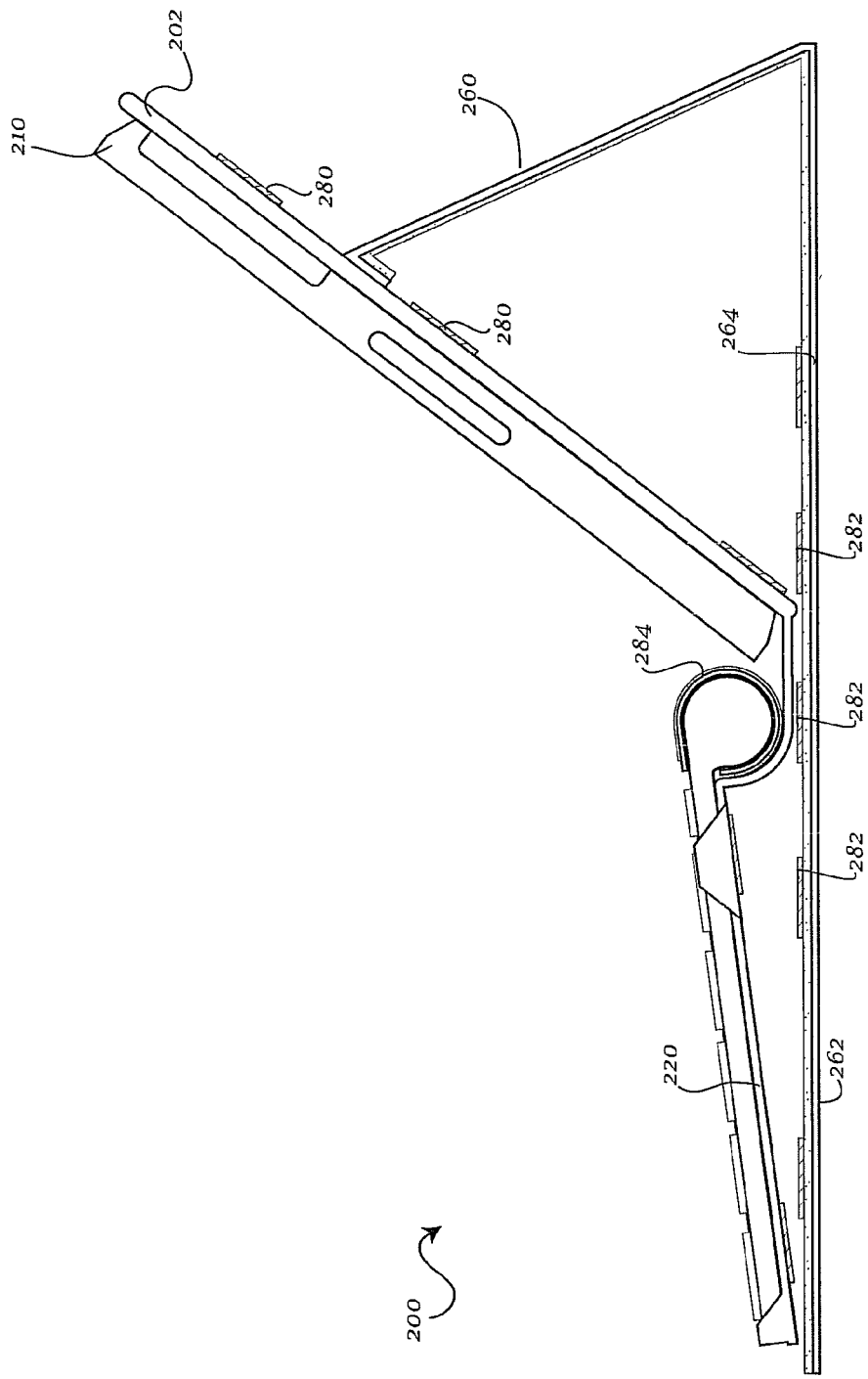
FIG. 11 shows the second exemplary embodiment of the case in a laptop mode configuration.
Figure 12:
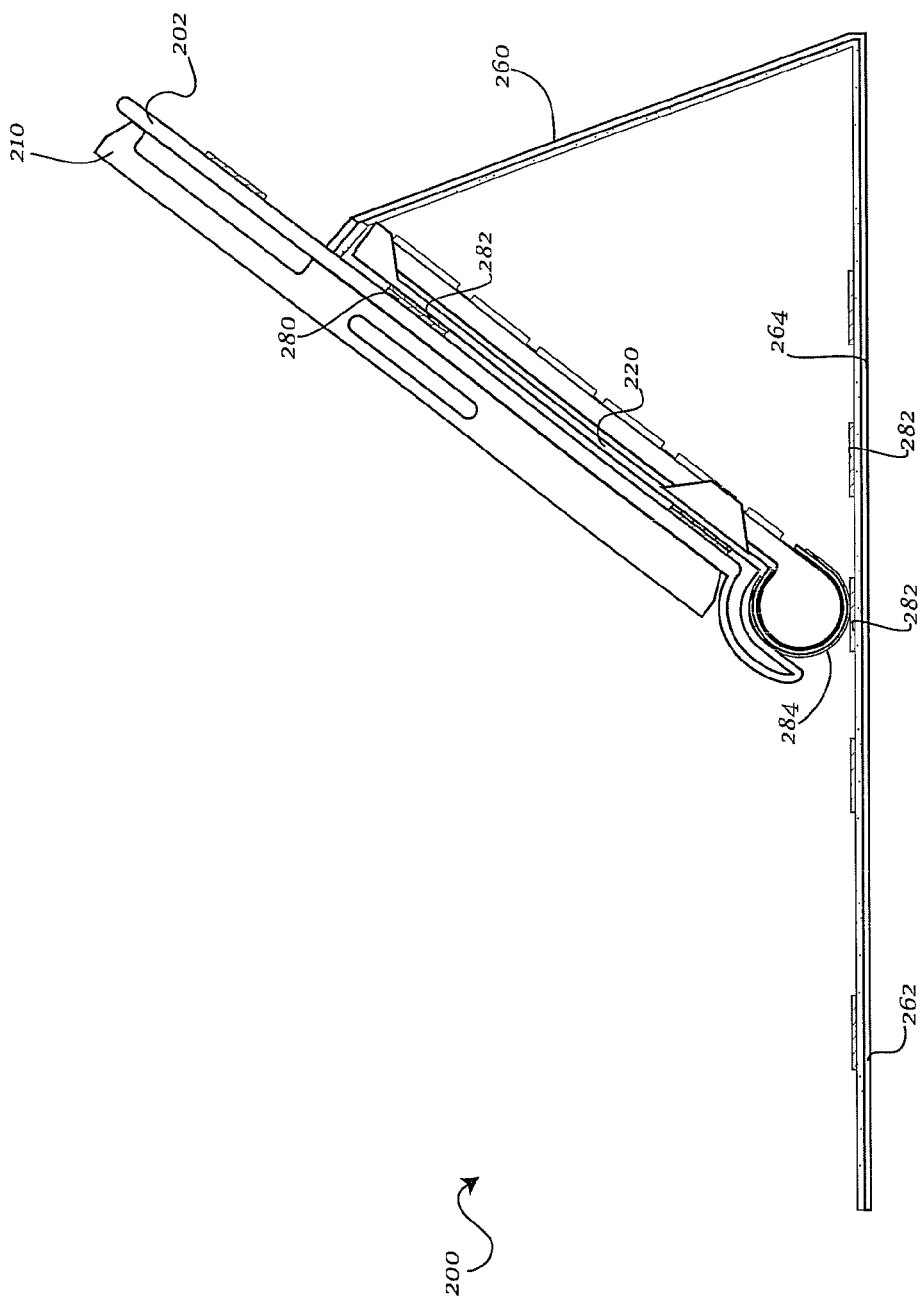
FIG. 12 shows the second exemplary embodiment of the case in a hidden keyboard laptop configuration.

As shown in FIGS. 11-12, when case 200 is in an exemplary laptop configuration or an exemplary hidden keyboard laptop configuration, fastening strips 284 of sheath 241 can couple to desired complementary magnetic fasteners 282 or complementary fastening strips 283 on first face 252 of cover portion 250, so as to prevent movement of tablet panel 202 and to allow the desired angle of tablet panel 202 to be securely maintained.

As shown in FIGS. 8a-12, the exemplary configurations of case 200 are substantially similar to the configurations of case 100. In the exemplary configurations, Magnets 280, 282 and magnetic strips 283, 284 provide for the desired couplings of the various panels and portions of case 200, as illustrated. It should be appreciated that the shown exemplary configurations of case 100 and case 200 are not the only possible configurations, and additional configurations may be contemplated and achieved as desired.

FIGS. 13a-14b illustrate another exemplary embodiment of a combination protective case and stand for a tablet device and keyboard 300. Most components of the embodiment of case 300 are the same or similar to those of the embodiments of case 100 and case 200, and are identified by similar numerals. Such components should be understood to have substantially similar characteristics and functionality in all embodiments.

Turning to FIGS. 13a-13b, case 300 may include a keyboard 30. Keyboard 30 may be provided in lieu of a keyboard panel and may be pivotably coupled to tablet panel 302 via flexible panel 330, as shown in FIGS. 13a-13b. Alternatively, keyboard 30 may be directly pivotably coupled to tablet panel 302. Keyboard 30 may be included in case 30 and may communicatively couple with a tablet device via any desired connection, for example, via a cable such as a USB-compliant cable, or via a wireless connection such as the Bluetooth wireless communication standard. If desired, keyboard 30 may be formed integral with case 300 or may be partially or substantially enclosed by case 300. For example, an integrally formed keyboard 30 may have an outer covering that is substantially similar to the outer covering of case 300, and which may be contiguous with the outer covering of case 300.

Alternatively, keyboard 30 may be separately formed from case 300 and may be included with the case. As shown in FIGS. 14a-14b, keyboard 30 may then be retained by a retention structure 325, which may be a panel, straps, outer shell, or any other structure that can retain keyboard 30 in place. Retention structure 325 may be formed from any desired material, for example the material of case 300, plastic, or the like.

Referring generally to FIGS. 13a-14b, the bottom 34 of keyboard 30 may include a plurality of complementary fasteners 382 disposed thereon. If keyboard 30 is disposed in a retention structure, the retention structure 325 may be configured such that the complementary fasteners on the bottom 34 of keyboard 30 can be exposed. Fasteners 382 may be, for example, looped fasteners or hooked fasteners of a hook-and-loop fastener arrangement, or any other desired fastener member that may couple to fasteners 380 disposed on the second face 306 of tablet panel 302. Fasteners 380, may be, for example, hooked fasteners or looped fasteners of a hook-and-loop fastener arrangement, or any other desired fastener member. Alternatively, complementary fasteners 382 may be formed from a ferromagnetic material, or may be permanent magnets oriented so as to couple with fasteners 380. Likewise, fasteners 380 may be formed from a ferromagnetic material or may be permanent magnets oriented so as to couple with complementary fasteners 382.

Keyboard 30 may further include fastening strips 384 disposed on the rear portion 32 of keyboard 30. Fastening strips 384 may be hooked fasteners or looped fasteners of a hook-and-loop fastener pair, or may be any other desired fastener member that is adapted to couple with napped covering 356 of cover portion 350. Alternatively, fastening strips 384 may be formed from a ferromagnetic material, or may be permanent magnets oriented so as to couple with fasteners 380 disposed on the first face 352 of cover portion 350.

It should be understood that the exemplary configurations of case 300 are substantially similar to the configurations of case 100 and case 200. Furthermore, the shown exemplary configurations of cases 100, 200 and 300 are not the only possible configurations, and additional configurations may be contemplated and achieved as desired.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A combination protective case and stand for a tablet device and keyboard, comprising:
    a tablet panel configured to receive and secure a tablet device, the tablet panel comprising a first tablet panel face and a second tablet panel face, the second tablet panel face located on an opposite side of the tablet panel with respect to the first tablet panel face;
    a flexible panel comprising a first flexible panel face and a second flexible panel face;
    a keyboard panel pivotably coupled to the tablet panel by the flexible panel, the keyboard panel comprising a first keyboard panel face and a second keyboard panel face, the first keyboard panel face integral with a keyboard or configured to receive a keyboard, the keyboard panel movable from a first position to a second position, the keyboard panel directly contacting the second face of the tablet panel at the second position;
    a cover portion comprising a first cover portion panel, a second cover portion panel, and a central cover portion panel interposing the first cover portion panel and the second cover portion panel, the central cover portion panel being flexible and pivotably coupled to the first cover portion panel and the second cover portion panel, the central cover portion panel being rigid and pivotably coupled to the first cover portion panel;

a second flexible panel; and a third flexible panel, the central cover portion pivotably coupled to the first cover portion panel by the second flexible panel, and the central cover portion pivotably coupled to the second cover portion panel by the third flexible panel.

2. The combination protective case and stand of claim 1, comprising:

a sheath configured to connect to the keyboard panel, the sheath comprising a third fastener.

3. The combination protective case and stand of claim 1, further comprising:

a covering disposed on the first cover portion panel;
a first fastener disposed on the second tablet panel face; and
a second fastener disposed on the keyboard panel.

4. The combination protective case and stand of claim 2, comprising:

a third fastener disposed on the first cover portion panel.

5. The combination protective case and stand of claim 4, the first fastener, the second fastener, or the third fastener further comprising a ferromagnetic material.

6. The combination protective case and stand of claim 1, the keyboard panel further comprising a keyboard.

7. The combination protective case and stand of claim 1, wherein the keyboard is removable from the keyboard panel.

8. The combination protective case and stand of claim 6, wherein the keyboard is directly attached to the tablet panel.

9. A combined case and stand apparatus useful for a tablet computing device and keyboard, comprising:

a tablet panel comprising a first tablet panel face and a second tablet panel face, the first tablet panel face comprising a tablet retaining structure, the tablet retaining structure configured to receive and securely maintain a tablet device comprising a screen, the tablet retaining structure configured to expose the screen of the tablet device for user operation; and a keyboard panel, the keyboard being integral with the keyboard panel, or the keyboard panel comprising a first face and a second face, the first face comprising a retaining structure, wherein the retaining structure is an outer shell configured to receive, cover, and securely maintain a keyboard, the keyboard panel pivotably coupled to the tablet panel, whereby the keyboard panel is movable with respect to the tablet panel, the keyboard panel movable to a compact configuration, wherein the second tablet panel face and the second keyboard face are positioned to face each other.

10. The combination protective case and stand of claim 3, the first fastener and the second fastener being hook-and-loop fasteners.

11. A combination protective case and stand for a tablet device and keyboard, comprising:

a tablet panel configured to receive and secure a tablet device, the tablet panel comprising a first tablet panel face and a second tablet panel face, the second tablet panel face located on an opposite side of the tablet panel with respect to the first tablet panel face;

a flexible panel comprising a first flexible panel face and a second flexible panel face;

a keyboard panel pivotably coupled to the tablet panel by the flexible panel, the keyboard panel comprising a first keyboard panel face and a second keyboard panel face, the first keyboard panel face integral with a keyboard or configured to receive a keyboard, and the keyboard panel being movable from a first position to a second position, wherein the keyboard panel directly contacts the second face of the tablet panel at the second position;

a first cover portion panel coupled to the tablet panel;
a second cover portion panel; and
a central cover portion panel, the central cover portion panel disposed between the first cover portion panel and the second cover portion panel.

12. The combination protective case and stand of claim 1, wherein the first flexible panel face or the second flexible panel face is folded to face itself when the keyboard panel is at the second position.

\* \* \* \* \*